Oct. 14, 1947.  H. P. SCHRANK  2,428,944
PROCEDURE AND APPARATUS FOR USE IN VULCANIZING HOLLOW SHAPED ARTICLES
Filed July 15, 1942
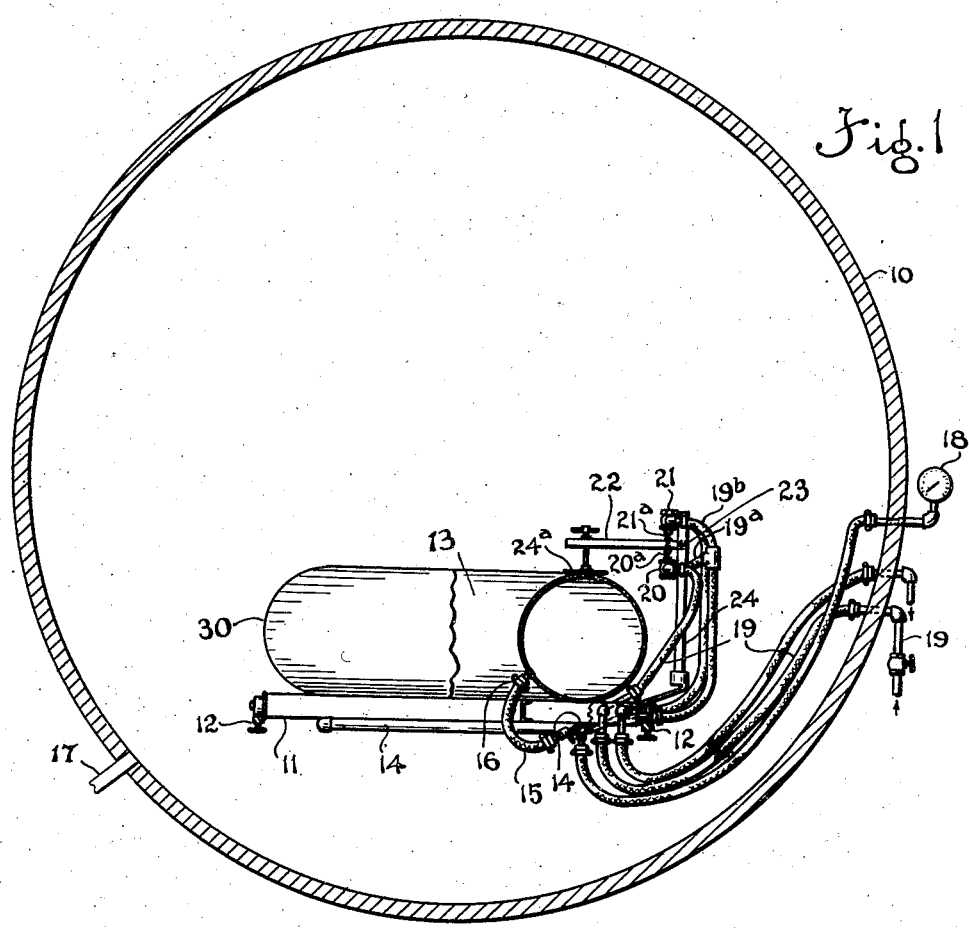
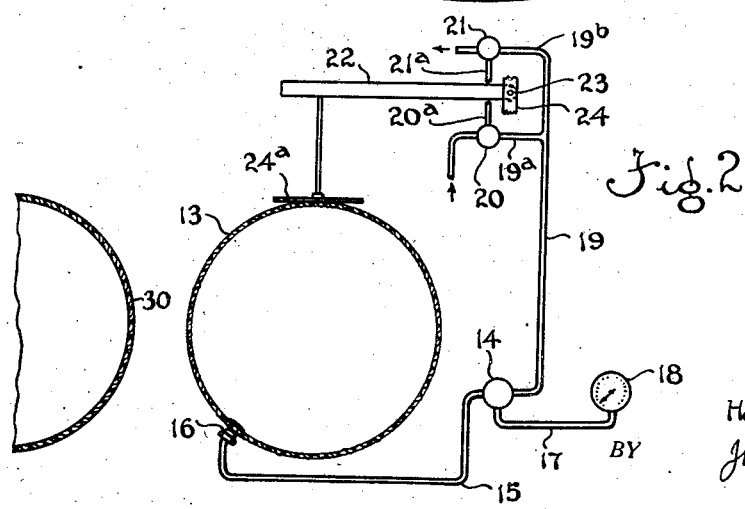
INVENTOR:
Harry P. Schrank
BY J Ralph Barrow
ATTORNEY Patented Oct. 14, 1947

2,428,944

UNITED STATES PATENT OFFICE 2,428,944

PROCEDURE AND APPARATUS FOR USE IN VULCANIZING HOLLOW SHAPED ARTICLES

Harry P. Schrank, Munroe Falls, Ohio, assignor to Seiberling Rubber Company, Barberton, Ohio, a corporation of Delaware Application July 15, 1942, Serial No. 450,996

4 Claims. (Cl. 18—6)

This invention relates to procedure and apparatus for use in vulcanizing hollow shaped articles of rubber, rubberized fabric or the like.

Hollow inflatable articles of rubber, rubberized fabric or the like and fabricated with one or more spliced or lapped joints, as is the case with inflatable boats and floats are preferably vulcanized under the direct heat and pressure of steam or like vulcanizing fluid, so as thoroughly to weld the spliced or lapped joints.

During the initial stages of the vulcanization the rubber softens and tends to flow, hence prior attempts to vulcanize such articles have not been entirely satisfactory, due to the production of articles of this kind with leaky vulcanized joints. This has been due either to stretching or wrinkling or buckling of the spliced or lapped joints depending upon whether the articles are over or under inflated during the cure.

It has been found that the successful vulcanization of such articles under the direct action of steam depends upon controlling the differential in pressure between the inside and outside of the article, this differential being slightly higher, say one-half ounce per square inch on the inside of the article, to hold it in the correct inflated shape in which it is to be vulcanized without folds or wrinkles, but being insufficient to stretch the article to spread or open the laps, seams or splices when the rubber softens during initial stages of vulcanization.

The articles may be pre-inflated and introduced into the vulcanizer or heater, but it will be apparent that due to variations in heat and pressure as the pre-inflated articles are subjected to the curing fluid, the differential in pressure at all times must be accurately controlled, otherwise the article may be unduly stretched by internal pressure or collapsed or wrinkled by excessive external pressure.

In accordance with the procedure of the present invention the fabricated article may be first inflated sufficiently to distend it to its normal shape without excessive stretching, and then means are so associated with the article as to be responsive to pressure differential or the change in shape of the article under the pressures of the fluids acting on them, to vary the pressure (as for example of the inflating medium) in accordance with changes in pressure differential or the shape of the hollow article whereby to maintain the pressure differential substantially constant at all times while the article is being cured.

The present invention has, therefore, the object of providing and adapting such procedure to vulcanization of hollow inflatable articles of rubber, rubberized fabric or the like, and also to provide suitable apparatus for carrying out such procedure.

Another object of the invention is to provide and adapt similar procedure and apparatus for use in vulcanizing or curing hollow articles of rubber or the like, whether such articles are flexible and inflatable or are of rigid construction.

The invention may be embodied and carried out in the apparatus illustrated in the accompanying drawings and described below, but it is to be understood that the invention is not limited to the specific form thereof illustrated and described.

Of the accompanying drawings:

Figure 1 is a sectional elevation through a vulcanizer or heater in which the improved apparatus is embodied and shown in use for vulcanizing an article such as an inflatable float of rubberized fabric, and Figure 2 is a diagrammatic view of the pressure differential control device and associated piping.

Referring to the drawings, the numeral 10 designates what is usually referred to in the art as an "open" heater into which a truck or dolly 11 may be run on rails 12, 12 and may support thereon a hollow inflatable float or boat 13, including one or more "cells" or compartments.

Associated with the dolly 11 is a manifold 14 from which one or more fluid supply connectors 15 may be extended to the one or more inflation valves 16 on each compartment or cell of the article. Means for supplying a fluid pressure medium around the article is shown at 17. On this manifold 14 there preferably is a pressure gauge 18 which may be arranged on the outside of the heater.

A fluid pressure supply line 19 is also connected to manifold 14 and on this line is a supply branch 19a and a pressure relief branch 19b. These branches may be extended to the outside of the heater as shown. The branch 19a is controlled by a supply valve 20 and the branch 19b by a similar valve 21 arranged to exhaust the inflating medium from supply line 19. Valves 20 and 21 may be of a known type including spring-pressed stems 20a and 21a, respectively, arranged to be depressed to open the valves.

In the particular embodiment of the invention shown, these valves are associated with an element 22 comprising a lever pivoted at 23 on a bracket 24 mounted on the dolly 11, and having depending from its free end a follower 24a arranged to rest on the inflatable article 13, whereby the lever 22 will be responsive to change in shape of the article 13 being raised when the article tends to become excessively inflated by internal pressure and being lowered when the article tends to become excessively compressed and collapsed by external pressure, the weight of the lever and follower being sufficient to cause it to ride on the surface of the article 13 at all times.

Lever 22 is shown arranged between valves 20 and 21 which are arranged with their operating stems 20a and 21a to be engaged and depressed by lever 22 as it moves in one direction or the other. There may be a slight clearance between the lever 22 and valve stems 20a and 21a when the parts are in a position representing normal pressure differential conditions (as illustrated), the valves being so set as to be normally closed to maintain normal differential pressure conditions when not operated by lever 22.

If the inflation pressure should fall (with respect to external pressure) then the weight of the lever 22 and follower 24 causes it to lower and this weight is sufficient to overcome the valve spring (not shown) on stem 20a and to open the inflation pressure supply valve 20, valve 21 being, of course, maintained closed by its spring-pressed stem 21a. The same result would occur if the external pressure should rise with respect to the internal or inflation pressure.

If the inflation pressure should rise (with respect to external pressure) to exceed the determinate differential, lever 22 will be swung upwardly depressing stem 21a into its valve 21 and opening said valve relieving the internal pressure. Valve 20, of course, will be in closed condition at this time. The pressure will thus be relieved until the desired differential is attained whereupon lever 22 will lower to its normal position shown. The same result will occur, as will be understood, should the external pressure fall with respect to the internal pressure.

It will be obvious that the invention may be embodied in many different forms with elements having various physical or mechanical characteristics so as to be responsive to pressure differential and operable to actuate the inflation and relief valves of one medium or the other, that is, of either the inflation pressure or the external pressure. The particular form of the invention shown is merely the simplest and best way of accomplishing the purpose.

Vulcanization of flexible or rigid articles of rubber under internal and external pressures may be controlled by use of an inflatable envelop of flexible material separate from the article being vulcanized, the change of shape of which under differential pressure acting in the heater may control the differential pressure acting on the separate article being cured. In fact one compartment of a multi-compartment boat or float 13 similarly serves to control differential pressure in all the compartments including the separate compartment 30 when a single control device, such as follower 24a as shown, is associated with the float or boat on said compartment 13.

What is claimed is:

1. That method for vulcanizing or curing hollow articles of rubber or the like under internal and external fluid pressures which comprises supplying fluid mediums under pressure internally and externally of such articles, associating with said article an inflatable envelop of flexible material and subjecting it to said internal and external pressures, and varying the pressure of one of said fluid mediums in accordance with changes in shape of said envelop under varying pressure differentials so as to maintain the pressure differential in the hollow articles substantially constant.

2. Apparatus for vulcanizing or curing hollow articles of rubber or the like under internal and external fluid pressures which comprises means for supplying fluid mediums under pressure internally and externally of said articles, means comprising a flexible inflatable envelop associated with said supplying means to be subjected to said internal and external pressures, and means controlled by change in shape of said envelop under varying pressure differentials for maintaining the pressure differential in said articles substantially constant.

3. Apparatus for vulcanizing or curing hollow articles of rubber or the like under internal and external fluid pressures which comprises means for supplying fluid mediums under pressure internally and externally of said articles, means comprising a flexible inflatable envelop associated with said supplying means to be subjected to said internal and external pressures, and means controlled by change in shape of said envelop under varying pressure differentials for maintaining the pressure differential in said articles substantially constant, said means comprising a follower engaged with said envelop.

4. Apparatus for vulcanizing or curing hollow articles of rubber or the like under internal and external fluid pressures which comprises means for supplying fluid mediums under pressure internally and externally of said articles, means comprising a flexible inflatable envelop associated with said supplying means to be subjected to said internal and external pressures, and means controlled by change in shape of said envelop under varying pressure differentials for maintaining the pressure differential in said articles substantially constant, said means including a follower engaged with said envelop and control valves actuated by said follower to supply and release pressure of a fluid medium.

HARRY P. SCHRANK.

REFERENCES CITED

The following references are of record in the file of this patent:

UNITED STATES PATENTS

| Number | Name | Date |
|---|---|---|
| 1,240,931 | Bradley | Sept. 25, 1917 |
| 2,014,010 | Wheatley | Sept. 10, 1935 |
| 1,671,275 | Clithero | May 29, 1928 |